Sept. 3, 1929.  F. WACHTER  1,727,146
METHOD OF INSULATING ELECTRICAL CONDUCTORS
Original Filed Nov. 27, 1925   2 Sheets-Sheet 1
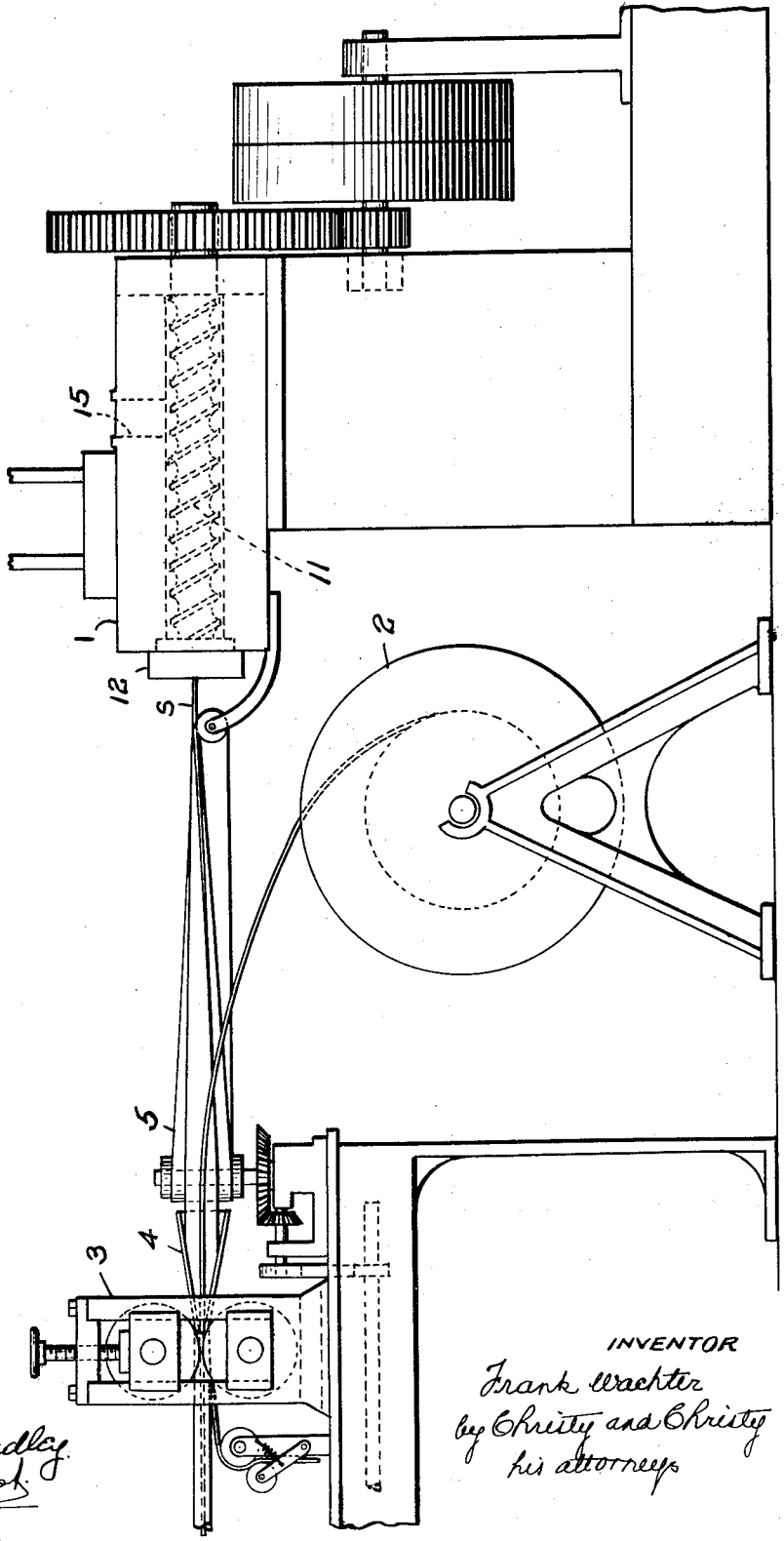

Sept. 3, 1929.　　　　F. WACHTER　　　　1,727,146
METHOD OF INSULATING ELECTRICAL CONDUCTORS
Original Filed Nov. 27, 1925　　2 Sheets-Sheet 2
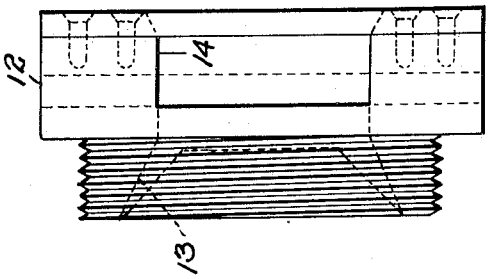
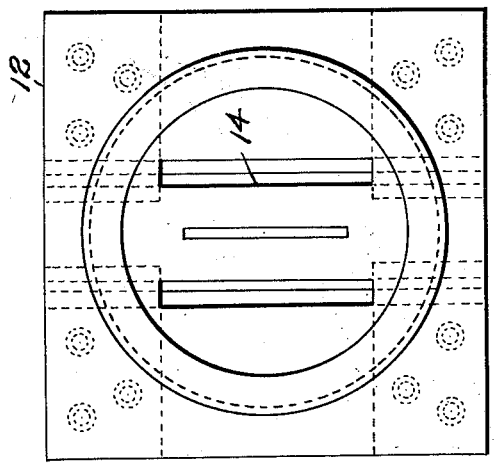
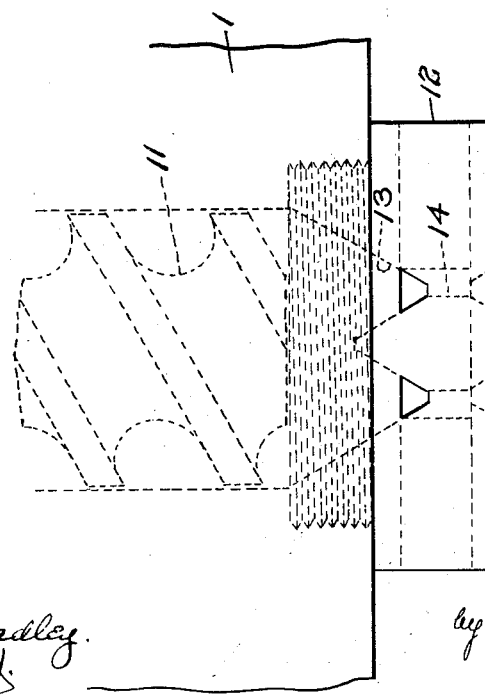
WITNESSES
INVENTOR
Frank Wachter
by Christy and Christy
his attorneys Patented Sept. 3, 1929.

1,727,146

UNITED STATES PATENT OFFICE.

FRANK WACHTER, OF ST. LOUIS, MISSOURI, ASSIGNOR, BY MESNE ASSIGNMENTS, TO GENERAL CABLE CORPORATION, A CORPORATION OF NEW JERSEY.

METHOD OF INSULATING ELECTRICAL CONDUCTORS.

Application filed November 27, 1925, Serial No. 71,593. Renewed March 1, 1929.

My invention relates to the insulation of electrical conductors and specifically to the enveloping of wire in rubber insulation. Apparatus in which and in the operation of which my invention is realized, is illustrated in the accompanying drawings. Fig. I is a view in side elevation of the entire apparatus. Figs. II, III, and IV are drawn to larger scale. Fig. II shows in plan the delivery end of a certain extruding machine which forms part of the apparatus shown assembled in Fig. I; and Figs. III and IV are views in front and side elevation of the head of the extruding machine.

Referring first to Fig. I, an extruding machine is shown at 1; a reel for wire, suitably mounted for rotation, is shown at 2; and a stand of compression rolls is shown at 3. From the extruding machine a strip of rubber is extruded; from the reel a length of wire is drawn; and into the pass between the compression rolls wire and rubber strip advance together. The rubber strip is shaped about the wire and is compressed in the roll pass to form a compact and continuous envelope of insulation.

The extruding machine includes a cylinder to which the numeral 1 is immediately applied, a spirally grooved shaft 11, rotatable within the cylinder, and a head 12, removably secured to the cylinder by being screw-threaded thereto. Within the head 12 one or more hopper-shaped recesses 13 are formed, continuous with the space within the cylinder, and this hopper-shaped recess, or these hopper-shaped recesses terminate apically in a slot or in slots 14 of proper shape and size.

The cylinder of the extruding machine is conveniently arranged in the horizontal position shown in Fig. I, and through its side wall, at a point remote from the head, opens a feed hopper 15. Through this feed hopper 15 rubber is introduced, and as the shaft 11 rotates, a strip of rubber s, of width and thickness determined by the dimensions of the slot 14, is extruded through the slot. So long as rubber is fed in, a strip will be continuously extruded.

The stand 3 of compression rolls is arranged conveniently opposite and in alignment with the slot of the extruding machine through which the strip of rubber is progressively extruded. A guide 4, which is stationary at the intake side of the roll pass is adapted to receive the strip, delivered to it in vertical position, and to shape the strip to an approximate annulus as it enters the roll pass. The rolls are provided with complementary semi-circular grooves. A suitably driven belt conveyor 5, arranged between the extruding machine and the stand of compression rolls, is adapted to receive the strip as it emerges from the head of the extruding machine, and to deliver it in the proper vertical position to the guide 4.

The reel 2 is suitably mounted, that in the operation of the machine the tension exerted in the roll pass upon the wire introduced within the rubber annulus and by the grooved rolls enveloped in rubber, is effective to draw the wire from the reel in continuous operation.

In the foregoing description of the apparatus the method of operation has been clearly indicated. From a body of rubber a strip is formed by extrusion. This strip is shaped about a wire. The meeting edges of the strip are, under compression, united, and, under compression, the rubber which constitutes the strip is formed into a compact, close-fitting massive continuous envelope of insulation upon the wire.

As the drawings indicate, the number of extrusion slots through the head of the extruding machine may be plural, and, accordingly, a plurality of roll passes and a corresponding plurality of wire reels may be combined in operation with a single extruding machine. The head of the extruding machine is removable and replaceable, and manifestly the blocks within the head, by means of which the extrusion slots are defined, may be removable, not only that worn and defective parts may be replaced, but also that the size or the number or the size and number of the slots in any given machine may be varied to meet particular conditions.

Referring again to the organized assembly of machine parts shown in Fig. I, it will be understood that the rate of rotation of the shaft 11 within the extruding head may be varied by known means, and that the speed of advance of the conveyor 5 may be rendered variable, and that these two factors may be adjusted to the speed of rotation of the rolls of the roll pass 3, to the end that the parts may cooperate in the manner indicated, to produce a uniform and satisfactory article.

Hitherto it has been the practice in fabricating rubber insulated wire, to calender rubber into sheets, then to cut the sheets into strips, and then to wrap the strips upon the wire. This operation is relatively slow and expensive and gives a relatively inferior product. It is not necessary to enlarge upon the heavy machinery required to calender rubber, nor upon the amount of labor and delay incident to the production of strips of rubber by such means. It is desirable to point out that, in the operation of calendering, the body of rubber is put under strain, and, lengthwise of the strip at least, the elasticity of the rubber is impaired to a very considerable extent.

In the practice of my invention described above, the rubber is shaped to a strip without stretching, and is shaped to the envelope without tension strain. To the contrary, the rubber throughout is subjected, not to extensive, but to compressive forces, and this compression tends to improve the condition of the rubber in the finished article, in contrast with the method of manufacture hitherto practiced, in which the tendency is to stretch the rubber and impair its elasticity.

The rubber may be fed to the extruding machine at elevated temperature, or not. The pressure exerted upon it in the extruding machine will tend to increase its temperature, and in any case the strip will emerge from the extruding machine in somewhat heated condition. In my preferred procedure the warm strip passes at once to the compression rolls and, with conservation of heat, the envelope is formed at elevated temperature—a circumstance which insures a more perfect product.

I claim as my invention:

The method herein described of covering wire with rubber insulation which consists in shaping by extrusion a body of rubber to strip form and in heated condition, and in shaping the strip while hot upon the wire.

In testimony whereof I have hereunto set my hand.

FRANK WACHTER.